(12) United States Patent
Phillips

(10) Patent No.: US 6,659,468 B1
(45) Date of Patent: Dec. 9, 2003

(54) ROTARY SEAL

(76) Inventor: Rodric J. Phillips, 4930 SW. Martha St., Portland, OR (US) 97211

( * ) Notice: Subject to any disclaimer, the term of this patent is extended or adjusted under 35 U.S.C. 154(b) by 0 days.

(21) Appl. No.: 10/079,717

(22) Filed: Feb. 19, 2002

Related U.S. Application Data
(60) Provisional application No. 60/270,491, filed on Feb. 21, 2001.

(51) Int. Cl.[7] ............................ B60T 11/236; F16J 15/34
(52) U.S. Cl. ...................... 277/436; 277/353; 277/500; 277/561; 277/433
(58) Field of Search ................................ 277/353, 500, 277/549, 550, 561, 436

(56) References Cited

U.S. PATENT DOCUMENTS

| | | | | |
|---|---|---|---|---|
| 2,959,431 A | * | 11/1960 | Foss ........................... | 277/356 |
| 3,325,172 A | * | 6/1967 | Herbold ....................... | 277/411 |
| 4,114,807 A | * | 9/1978 | Naseck et al. ............... | 236/1 E |
| 4,426,086 A | * | 1/1984 | Fournie et al. .............. | 277/309 |
| 5,556,112 A | * | 9/1996 | Brandt ......................... | 277/560 |
| 5,921,555 A | * | 7/1999 | Johnston ...................... | 277/559 |
| 6,443,459 B2 | * | 9/2002 | Lebeau et al. ............... | 277/372 |

* cited by examiner

Primary Examiner—Anthony Knight
Assistant Examiner—E Peavey
(74) Attorney, Agent, or Firm—John Smith-Hill; Smith-Hill and Bedell

(57) ABSTRACT

A seal includes an annular seal body and an annular lip attached to the seal body and extending radially outwards from the seal body. The annular lip has a stem and a tip and is attached to the seal body in a manner allowing deflection of the lip relative to the seal body.

14 Claims, 2 Drawing Sheets

ROTARY SEAL

CROSS-REFERENCE TO RELATED APPLICATION

This application claims benefit of Provisional Application No. 60/270,491 filed Feb. 21, 2001. The entire disclosure of Provisional Application No. 60/270,491 is hereby incorporated by reference herein for all purposes.

BACKGROUND OF THE INVENTION

This invention relates to a rotary seal.

There are many circumstance in which a mechanism that is mounted to a stationary member interacts with a rotary member. It might be necessary or desirable to protect the mechanism from contact with foreign matter, such as dust, particularly when the rotary member is rotating at low speed or is stationary. The mechanism may be protected from dust by a housing having a rotary part attached to the rotary member and a stationary part attached to the stationary member.

SUMMARY OF THE INVENTION

In accordance with a first aspect of the invention there is provided a rotary seal comprising an annular seal body and an annular lip attached to the seal body and extending radially outwards from the seal body, the annular lip having a stem and a tip and being attached to the seal body in a manner allowing deflection of the lip relative to the seal body.

In accordance with a second aspect of the invention there is provided a rotational assembly including a stationary part, a rotary part mounted to rotate relative to the stationary part about an axis, and an annular seal attached to the rotary part and coaxial therewith, the seal comprising a seal body and a lip attached to the seal body and extending outwards from the seal body, the lip having a stem and a tip and being attached to the seal body in a manner allowing deflection of the lip relative to the seal body, and wherein the tip engages the stationary part when the rotary part is not rotating or is rotating at a low speed and tends to lift away from the stationary part when the rotary part is rotating at higher speed.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
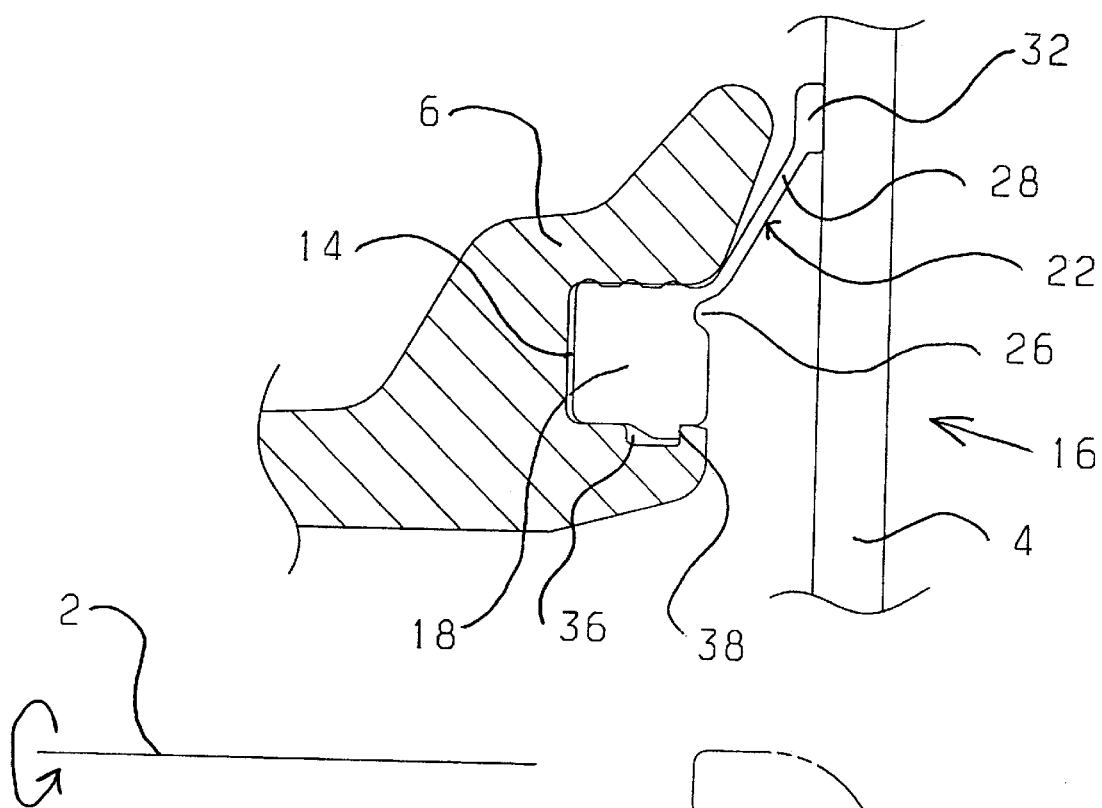
FIG. 1 is a radial sectional view of a rotary seal embodying the present invention, the seal being illustrated in the configuration when the seal is either not rotating or is rotating at a relatively low speed.
Figure 2:
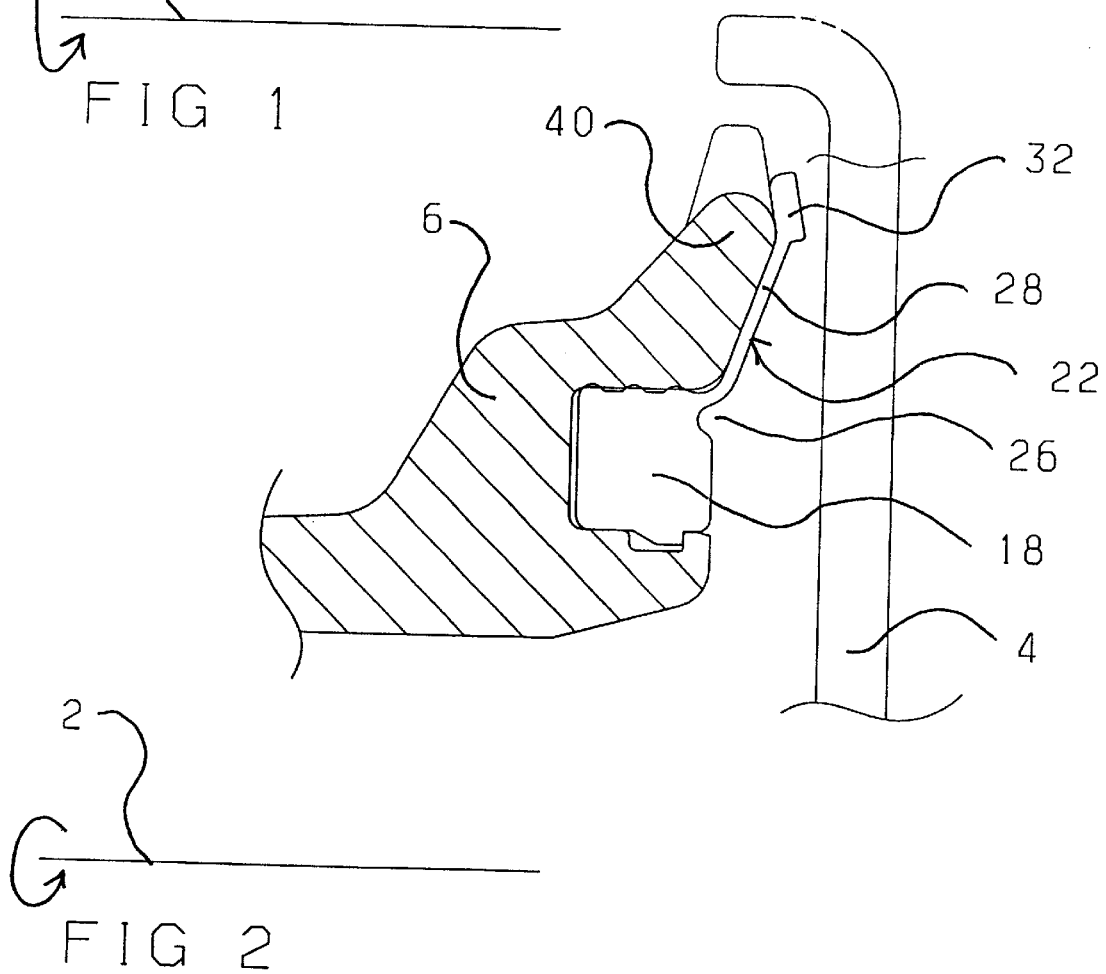
FIG. 2 is a similar view illustrating the seal in a configuration in which the seal is rotating at a relatively high speed.

FIGS. 1 and 2 show partially a housing having a stationary part 4 and a rotary part 6. The stationary part 4 may be attached to a spindle (not shown) and the rotary part 6 may be a attached to a hub (not shown) that is journalled on the spindle by a suitable bearing. Alternatively, the stationary part may be attached to the outer race of a bearing and the rotary part may be attached to a shaft passing through the inner race of the bearing. In any event, the rotary part 6 is subject to being rotated relative to the stationary part 4 about an axis that is parallel to the axis 2 shown in FIGS. 1 and 2.

A mechanism (not shown) is mounted in the housing formed by the rotary and stationary housing parts, and the function of the housing is to protect the mechanism from water and dust, particularly when the rotary part 6 is stationary or rotating at low speed.

The stationary part 4 has a surface that is substantially perpendicular to the axis 2. The rotary part 6 has a generally annular end face presented towards the housing part 4 and spaced therefrom. An annular groove 14 is provided in the end face of the rotary part. An annular seal 16 includes a body 18 held in the groove 14 and a lip 22 connected to the seal body 18. As shown in FIG. 1, the lip 22 has a relatively slender stem 28 and a thicker tip 32.

The body 18 is provided with a pocket recess 26 at the root of the stem 28. The recess 26 allows hinged deflection of the lip 22 relative to the body 18. The mass of the lipper unit length parallel to the axis 2 is greater at the tip of the lip than over the stem. The seal is made of a resiliently deformable material such as neoprene or nitrile and is molded so that when the rotary part 6 is not rotating, the tip 32 bears lightly against the stationary part 4. The tipthus provides a seal against the stationary part 4.

Figure 3:
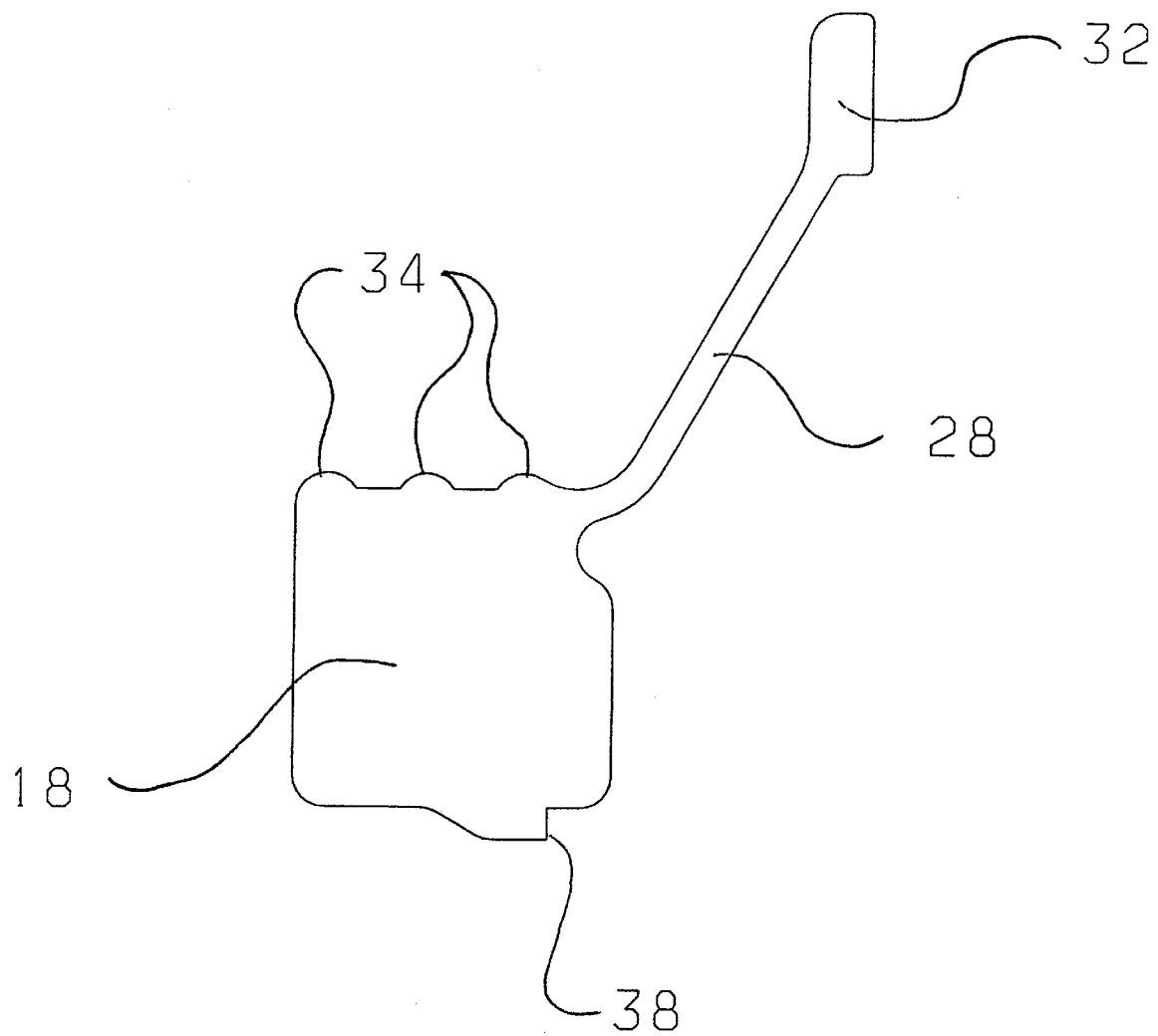
FIG. 3 is an enlarged view of the seal.

As shown in FIG. 3, the seal body 18 has three peripheral ribs 34 that are compressed against the outer peripheral surface of the groove 14. In this manner, a seal is provided between the seal body 18 and the rotary part 6.

At its inner peripheral surface, the groove 14 is provided with an annular locking recess 36, and the seal body 18 is provided with an annular locking rib 38 at its inner peripheral surface. When the seal body is installed in the groove 14, the locking rib 38 engages the locking recess 36, holding the seal in position relative to the rotary part.

If the rotary part is stationary or is rotating at low speed, e.g. below about 100 rpm, the tip 32 of the seal remains in contact with the stationary part 4. In the event that water is sprayed on the housing or the housing is immersed in water, the seal prevents entry of water into the housing and the mechanism inside the housing is protected from the water. The housing also protects the mechanism from dust that may be present in the air. At higher rotational speeds, e.g. above about 150 rpm, the tip lifts off the stationary part, avoiding excessive wear of the tip against the stationary part as the rotary part rotates. When the rotational speed falls below about 100 rpm, the tip lowers back to the stationary part and restores the seal. At high speed, the tip lies up against a peripheral flange 40 of the rotary part (FIG. 2) so that the lip does not exert excessive stress on the hinge.

For a given radius of the inner periphery of the lip, the sensitivity of the seal to change in speed of rotation of the rotary part depends on the radius of the tip, the thickness of the stem, and the mass of the tip. Thus, the sensitivity may be increased by increasing the radius of the tip of the seal, reducing the thickness of the stem, or increasing the mass of the tip.

The mass of the tip depends directly on the mass of the tip per unit length parallel to the axis 2. Thus, by thickening the tip of the lip relative to the stem, as shown in FIGS. 1–3, the sensitivity of the seal is greater than it would be if the lip were of uniform thickness.

In a modification, the two housing parts are formed to provide a labyrinth seal that resists entry of water or dust into the housing independently of the seal 16. For example, as shown in phantom in FIG. 2, the stationary part may have a peripheral flange structure, including a radial segment that extends radially outwards beyond the tip and an axial segment that extends over the seal 16, parallel to the axis of rotation of the rotary part; and correspondingly the rotary part may be provided with a radial flange that extends radially outwards to a position close to, but not contacting, the axial segment of the peripheral flange structure of the stationary part.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A rotational assembly including a stationary part, a rotary part mounted to rotate relative to the stationary part about an axis, and a seal attached to the rotary part for rotation therewith, the seal being annular and coaxial with the rotary part and comprising a seal body and a lip attached to the seal body and extending outwards from the seal body, the seal body being attached to the rotary part in a manner that provides a seal between the seal body and the rotary part, and the lip having a stem and a tip and being attached to the seal body in a manner allowing deflection of the lip relative to the seal body, and wherein the tip engages the stationary part of the rotational assembly when the rotary part of the rotational assembly is not rotating or is rotating at a low speed and tends to lift away from the stationary part when the rotary part is rotating at higher speed.

2. A rotational assembly according to claim 1, wherein the lip is of greater mass per unit length parallel to said axis at the tip of the lip than over the stem of the lip.

3. A rotational assembly according to claim 1, wherein the rotary part of the rotational assembly is formed with an annular groove and the seal body is annular and is located in the annular groove under compression between inner and outer peripheral surfaces that bound the annular groove.

4. A rotational assembly according to claim 3, wherein the rotary part of the rotational assembly is formed with a locking recess at one of said surfaces that bound the annular groove and the seal body is formed with a projection that engages the locking recess for retaining the seal body in the annular groove.

5. A rotational assembly according to claim 3, wherein the rotary part of the rotational assembly is formed with an annular locking recess at one of said surfaces that bound the annular groove and the seal body is formed with an annular locking rib that engages the locking recess for retaining the seal body in the annular groove.

6. A rotational assembly according to claim 1, wherein the rotary part of the rotational assembly is formed with an the annular groove and the seal body is annular and is located in the annular groove and has at least one peripheral rib that is compressed against a peripheral surface of the annular groove.

7. A rotational assembly according to claim 6, wherein the annular groove has inner and outer peripheral surfaces, said peripheral rib is compressed against the outer peripheral surface of the annular groove, the rotary part of the rotational assembly is formed with an annular locking recess at the inner peripheral surface of the annular groove, and the seal body is formed with an annular locking rib that engages the locking recess for retaining the seal body in the annular groove.

8. A housing comprising a non-rotary part, a rotary part mounted to rotate relative to the non-rotary part about an axis, and an annular seal attached to the rotary part for rotation therewith, the seal being annular and coaxial with the rotary part and comprising a seal body and a lip attached to the seal body and extending outwards from the seal body, the lip having a stem and a tip and being attached to the seal body in a manner allowing deflection of the lip relative to the seal body, and wherein the tip engages the non-rotary part of the housing when the rotary part of the housing is not rotating or is rotating at a low speed and tends to lift away from the non-rotary part when the rotary part is rotating at higher speed.

9. A housing according to claim 8, wherein the lip is of greater mass per unit length parallel to said axis at the tip of the lip than over the stem of the lip.

10. A housing according to claim 8, wherein the rotary part of the housing is formed with an annular groove and the seal body is annular and is located in the annular groove under compression between inner and outer peripheral surfaces that bound the annular groove.

11. A housing according to claim 10, wherein the rotary part of the housing is formed with a locking recess at one of said surfaces that bound the annular groove and the seal body is formed with a projection that engages the locking recess for retaining the seal body in the annular groove.

12. A housing according to claim 10, wherein the rotary part of the housing in formed with an annular locking recess at one of said surfaces that bound the annular groove and the seal body is formed with an annular locking rib that engages the locking recess for retaining the seal body in the annular groove.

13. A housing according to claim 8, wherein the rotary part of the housing is formed with an annular groove and the seal body is annular and is located in the annular groove and has at least one peripheral rib that it compressed against a peripheral surface of the annular groove.

14. A housing according to claim 13, wherein the annular groove has inner and outer peripheral surfaces, said peripheral rib is compressed against the outer peripheral surface of the annular groove, the rotary part of the housing is formed with an annular locking recess at the inner peripheral surface of the annular groove, and the seal body is formed with an annular locking rib that engages the locking recess for retaining the seal body in the annular groove.

* * * * *